Dec. 18, 1928.   1,695,714
J. H. K. McCOLLUM
CONSTANT VOLUME AND CONSTANT COMPRESSION
ENGINE AND METHOD OF OPERATING SAME
Original Filed Jan. 19, 1922
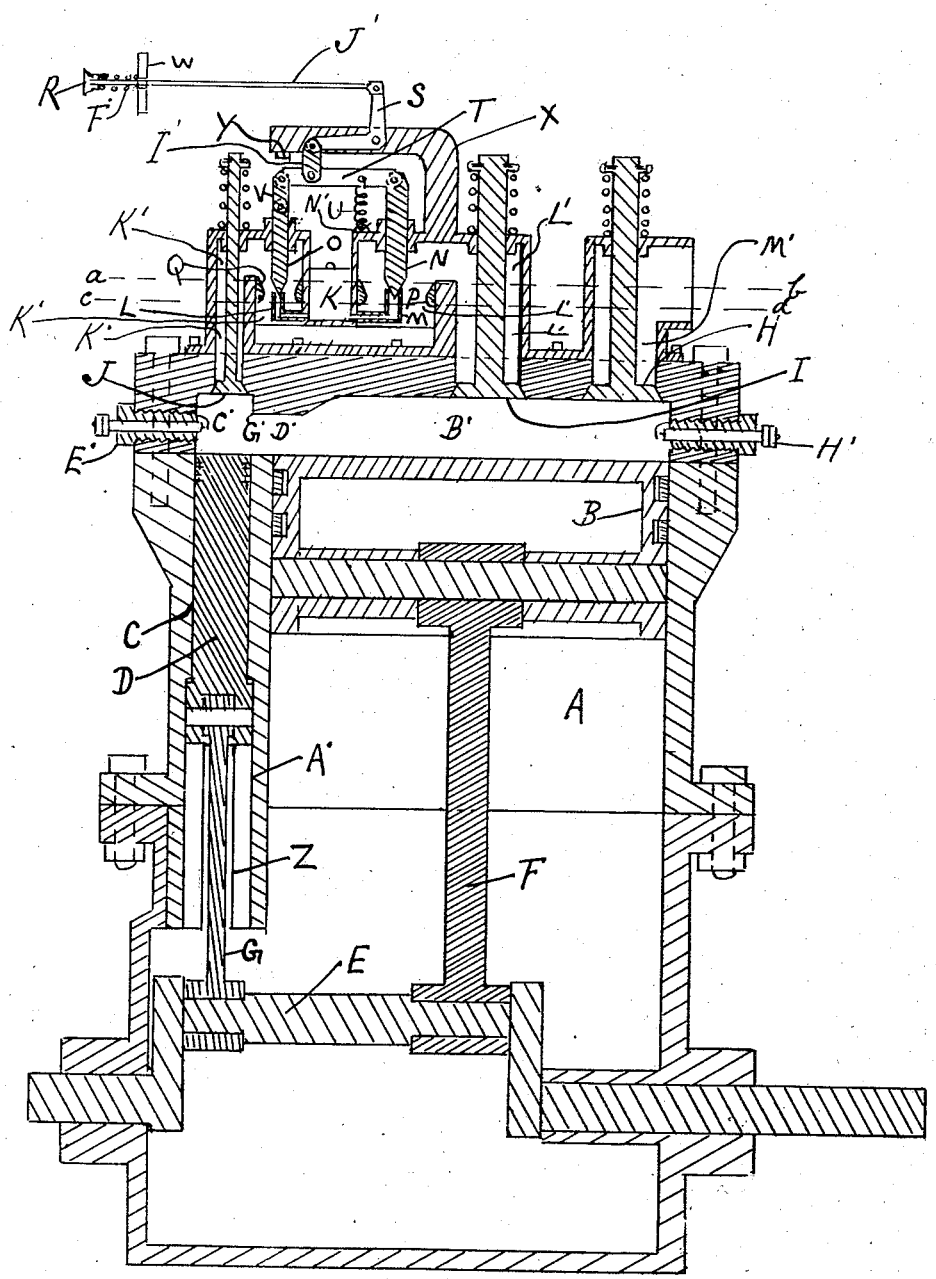

Patented Dec. 18, 1928.

1,695,714

UNITED STATES PATENT OFFICE.

JAMES HARRY KEIGHLEY McCOLLUM, OF LONG BRANCH, NEW JERSEY, ASSIGNOR OF ONE-HALF TO BARTLEY J. WRIGHT, OF LONG BRANCH, NEW JERSEY, AND ONE-FOURTH TO ALBERT J. BARUTH, OF LAWRENCE, NEW YORK.

CONSTANT-VOLUME AND CONSTANT-COMPRESSION ENGINE AND METHOD OF OPERATING SAME.

Application filed January 19, 1922, Serial No. 530,410. Renewed May 16, 1928.

My invention relates to improvements in internal combustion engines, of the constant volume and constant compression type, and the objects of my improvements are, first, to obtain high economy; second, simplicity of action; third, diminution in carbon deposit; fourth, elimination of the necessity of the compensating carburetor.

I attain these objects by the mechanism illustrated in the accompanying drawing, in which the figure is a vertical section of the engine.

A is the main cylinder, B the piston for same, C is the auxiliary cylinder, D the piston for same, both pistons are moved by the same crank E to which they are connected by the connecting rods F and G, both pistons move upwardly at the same time and downwardly at the same time. In the drawing the stroke of each piston is the same but the length of the stroke of the two pistons can be different.

There are three valves, the exhaust valve H, the inlet valve I and the inlet valve J all mechanically driven in the well known way. I is the inlet valve for the cylinder A and J the inlet valve for the cylinder C, the exhaust valve H acts as the exhaust valve for both the cylinders A and C. There therefore is no exhaust valve for cylinder C. K, L, M, N, O is a float chamber controlled mixing valve, P and Q are Venturi tubes, R is the foot accelerator, S a bell crank, T a link, U a spring, W the dash of an automobile, V a link, X a support, Y a stop for valve O. Z are slots in the walls of the guide A′ to allow for the swing of the connecting rod G. When the stroke of each piston is the same the different lengths of the connecting rods F and G and the general arrangement shown in the drawing is preferable  Inlet valves I and J open and close practically at the same time but the timing of the valves I and J can be altered to suit conditions.

The action of the engine is as follows:—
The drawing shows the engin at the beginning of the inlet stroke. There is no throttle valve used with this engine, so consequently the cylinders receive their full charges at all times. The accelerator R is moved slightly towards the dash W, this draws the needle valve O slightly out of nozzle L and the engine is started by self-starter or crank. The pistons D and B move downwadly in their suction stroke, the inlet valves I and J being open during said suction stroke, a very lean mixture being drawn in through valve J and air only being drawn in through valve I, the proper proportioning of the combustion chambers and of the areas and strokes of the pistons B and D and of the air-intakes to valves I and J, and of said valves themselves prevent any air being drawn from space B′ to space C′ through opening D′ or any mixture being drawn from space C′ to space B′ through opening D′. At the end of the suction stroke cylinder C is full of mixture and cylinder A is full of air, the pistons D and B move upwardly in the compression stroke and at the end of same the mixture is compressed in space C′ and the air is compressed in the space B′. The raising of the pressure in spaces B′ and C′ being the same, nothing flows from space B′ to C′ or from space C′ to B′, complete stratification in a practical sense takes place. The spark plug E′ fires the mixture charge in space C′ which in turn is completely burnt by the excess air compressed in space B′. The relative cubic contents of the cylinders A and C are such that when a mixture just rich enough to make certain of firing is drawn into cylinder C this mixture when compressed and fired will so heat the total charge in the engine that satisfactory idling of the engine will take place or be obtained. To increase the power of the engine a little the foot accelerator is moved a little more towards the dash W, this pulls needle valve O out of nozzle L a little more and the mixture drawn into the cylinder C is made more rich, but when compressed and fired is burnt completely by the excess air in space B′. It may not be possible to enrich the mixture drawn into the cylinder C enough to obtain the maximum power of the engine, so the arrangement shown at T, U, N, M, Y can be used, when the top of the link V strikes the stop Y and the accelerator R is then moved farther toward the dash W, the resistance of the spring U is overcome and needle-valve N is pulled out of nozzle M. Mixture will then be drawn into both cylinders C and A. A spark plug firing simultaneously with plug E′ can be used with cylinder A, said spark plug being shown at H′. The relative sizes of the Venturi tubes Q and P will, when properly proportioned, prevent any mixture from flowing from space C' to space B' or any air from flowing from space B' to space C' provided there is no greater restriction of the inflowing air by valves I and J, or elsewhere in the intake passages. If it can be found that the full power of the engine can be obtained without introducing any mixture into the cylinder A, but by enriching the mixture being drawn into cylinder C, then the needle-valve N and nozzle M and link T will be dispensed with and the bell-crank S be attached to the link V. The spaces C', D' and B' constitute the combustion chamber of the engine. The connecting passage D' flares continuously from cylinder C to cylinder A, the side walls of said passage being tangential to the walls of both cylinders, as is shown by the absence of any vertical wall junction lines in the drawing. The spring F' returns accelerator R to its place when pressure of foot is released. The bell-crank S can also be actuated by the hand-throttle. This engine can be used as a single or multiple cylinder engine, as is obvious to anyone skilled in the art. The projection G' is used to keep the mixture coming in through the valve J from being forced into space B' by its own momentum but this is not always required. The gasoline or fuel level can be below the level of the tops of nozzles L and M or above the level of the tops of nozzles L and M as shown by the dotted lines C and D or A and B. When used as a single cylinder engine the arrangement shown in Figure I can be employed. When used as a double cylinder engine the order will be bearing, large cylinder, small cylinder, small cylinder, larger cylinder, bearing. When used as a three cylinder engine the order will be bearing, large cylinder, small cylinder, large cylinder, small cylinder, large cylinder, small cylinder and bearing. When used as a four cylinder engine the order will be bearing, large cylinder, small cylinder, small cylinder, large cylinder, bearing, large cylinder, small cylinder, small cylinder, large cylinder, bearing. When used as a six cylinder engine the order will be bearing, large cylinder, small cylinder, small cylinder, large cylinder, bearing, large cylinder, small cylinder, small cylinder, large cylinder, bearing, large cylinder, small cylinder, small cylinder, large cylinder, bearing.

It will thus be obvious how this engine can be used as a twin four or a twin six cylinder engine by having two four cylinder engines as above in twin arrangement or by having two six cylinder engines as above in twin arrangement. It is also plain to anyone skilled in the art to understand how engines having more than eight or twelve cylinders can be used embodying my invention. When multiple cylinder engines embodying my invention are used the manifolding must be taken into consideration. The method of manifolding preferred is that having all the small cylinders connected by one inlet manifold having one venturi, nozzle, needle valve and float chamber to take care of all the small cylinders, also having one inlet manifold connected to all the large cylinders having one venturi with or without nozzle, needle valve and float chamber to take care of the large cylinders. The usual exhaust manifold may or may not be used.

While the particular form of fuel graduating device, or carburetor, herein shown and described is operative, I have found that more accurate fuel regulation can be secured by use of the modified form of carburetor described and claimed in my copending application, Serial No. 708,271, filed April 22, 1924.

An important advantage of my herein described invention arises from the practically complete localization about the point of ignition in the compression space C' of the smaller cylinder of the small charges of combustible mixture used when the motor is running under light loads, while maintaining free access to the main cylinder for the expanding products of combustion resulting from ignition of the charge in space C'. In this way the formation of the much desired stratified charge is successfully attained. At the same time the maximum output of power, obtainable only with maximum fuel supply and highest volumetric efficiency, can be secured by admitting additional fuel direct to the larger cylinder when full load is approached. There being no throttling of the incoming air under any condition of engine operation, except such as may be created near the fuel nozzles by the venturis for the purpose of breaking up liquid fuel, the engine is working at full volumetric efficiency at all times. These conditions result in the development of maximum power, when sufficient fuel is supplied, and complete combustion, at relatively low cylinder temperatures, of any lesser quantities of fuel admitted under less than maximum load conditions. This last mentioned result follows from the excess of oxygen always present in the larger cylinder, and the maximum quantity of inert gases (nitrogen of the air and residual gases of combustion) there present and available for expansion by absorption of heat from the burning constituents of the charge. I therefore secure in practice all the theoretical advantages of a motor operating with a stratified charge which include absence of carbon deposits in the combustion chamber and high fuel economy, because of complete combustion, small radiation losses and economy of lubrication, because of low cylinder temperatures, smoothness of operation because of cushioning effect of the surplus air, and reduction of useless work ordinarily expended in sucking in air through a half closed throttle, all throttling being eliminated at all times in my invention. There being no variable throttling, the air drawn into both cylinders of my improved motor is at substantially constant, or fixed, tension whatever the speed being developed or load being carried, because its pressure is always but slightly lower than that of the external atmosphere, the partial vacuum in the cylinders during each intake stroke being only that necessary to draw the air in through wide open inlet passages.

These characteristics of my improved engine render it a highly desirable one for use in motor cars as it develops economy of fuel at moderate and slow speeds such as are employed in ordinary driving on level roads and in city streets, while having in reserve immense power for hill climbing and heavy going. With my invention a large engine can be used with practically the same or even greater fuel efficiency at ten percent load than under maximum duty conditions. Also, when this engine is used in motor boats, high fuel economy is attained at cruising speeds, while the reserve power for speed bursts is also present.

The segregation of the combustible mixture at all times prior to ignition in a zone about the point of ignition is obviously effected by drawing said mixture into, and compressing it in, the small ignition chamber by mechanical means separate from the main piston in the larger cylinder, instead of requiring the suction of one large piston to fill both chambers. As the combustible mixture is drawn into the small cylinder and compressed therein by a separate piston, there is no opportunity for it to be mixed with any portion of the main charge of air, as has been the case when attempts have heretofore been made to compress the combustible charge by forcing into the chamber containing it a portion of the main or incombustible charge undergoing compression. Consequently, a plane of demarcation is always substantially preserved between said zone of combustible mixture in the small ignition chamber and the larger body of air, or of less combustible mixture, in the main cylinder or compression chamber, although these two have an open connection between them, and this is important because any constriction of this connection would evidently reduce the efficiency of the engine as it would partly throttle the expansion of the burning gases in the smaller ignition chamber when they seek to flow out into the main cylinder. In the particular embodiment of my invention here shown the separate suction and compression means comprises the smaller cylinder C and the piston D therein which is directly connected to the main crank, but obviously some other separate mechanism might be substituted for this purpose.

It is apparent therefore that my invention embodies a new method of developing variable power by stratified charges in that type of combustion engine in which the fuel is sucked in, as distinguished from being forced in, to the combustion chamber, which method has as its main novel features, the simultaneous admission of the maximum, and therefore nearly constant charges of air at substantially constant tension to separate but connected combustion chambers of widely different cubic capacities, the admission of graduated quantities of fuel to the smaller combustion chamber, the compression of the combustible and non-combustible charges so formed in their respective chambers and without intermingling them, and the ignition in said smaller chamber of the combustible charge so formed and compressed therein. This method of procedure might be carried into operation by different apparatus from that herein shown and described but which would still embody the broad principle of my invention.

Having described my invention, I claim:

1. An internal combustion engine of the compression type having in combination a main cylinder and piston reciprocating therein, an ignition chamber separate from, but having a substantially unrestricted connection with, said main cylinder, means for admitting charges of air at substantially atmospheric pressure simultaneously to both said main cylinder and said chamber during each cycle of operation of the engine, mechanism separate from, but operating synchronously with, the piston in said main cylinder for giving substantially the same degree of compression to the charge in said chamber as is given to that in said cylinder by the piston in the latter, apparatus for feeding graduated quantities of fuel to said chamber and an ignition device located in said chamber.

2. A combination such as set forth in claim 1 in which said fuel feeding apparatus discharges into the air inlet to said ignition chamber.

3. A combination such as set forth in claim 1 in which said ignition device is located adjacent to the fuel inlet to said ignition chamber.

4. A combination such as set forth in claim 1 in which said mechanism for compressing the charge in said ignition chamber comprises a small cylinder and a piston therein connected to a crank rotated by the piston in the main cylinder.

5. A combination such as set forth in claim 1 in which there is a single exhaust port which opens from said main cylinder.

6. A combination such as set forth in claim 1 in which said means for admitting charges of air comprises separate valves, one controlling admission to said main cylinder and the other controlling admission to said ignition chamber.

7. An apparatus such as set forth in claim 1 combined with a means for admitting graduated quantities of fuel directly to said main cylinder.

8. An internal combustion engine of the compression type having, in combination, a crank shaft, a main cylinder of relatively large capacity with a piston reciprocating therein and connected to said crank shaft, a second cylinder of relatively much smaller capacity with a piston reciprocating therein and also connected to said crank shaft, an unobstructed passageway connecting the ends of said cylinders farthest removed from said crank shaft, means for admitting full charges of air to both said cylinders, apparatus for feeding graduated quantities of fuel to said smaller cylinder, during the intake stroke of the piston therein, and an ignition device located in the compression space of said smaller cylinder.

9. A combination such as set forth in claim 8 in which said fuel feeding apparatus discharges into the air inlet to said smaller cylinder.

10. A combination such as set forth in claim 8 in which said ignition device is located adjacent to the fuel inlet to said smaller cylinder.

11. A combination such as set forth in claim 8 in which there is a single exhaust port which opens from said larger cylinder.

12. A combination such as set forth in claim 8 in which said means for admitting charges of air comprises separate valves one controlling admission to each of said cylinders respectively.

13. A combination such as set forth in claim 8 in which said passageway connecting said two cylinders has straight side walls substantially tangential to the walls of both cylinders.

14. A combination such as set forth in claim 8 in which the means for admitting a full charge of air to said smaller cylinder comprises an air-intake conduit and a valve controlling said conduit, and in which said fuel feeding apparatus discharges into said conduit outside of said valve.

15. An apparatus such as set forth in claim 8 combined with separate means for admitting additional graduated quantities of fuel to said larger cylinder.

16. An internal combustion engine of the compression type having, in combination, a crank shaft, two cylinders with pistons therein connected to said crank shaft, an unobstructed passageway connecting the ends of said cylinders furthest removed from said crank shaft, means for admitting full charges of air to both said cylinders, apparatus for feeding graduated quantities of fuel to one of said cylinders during the intake stroke of the piston therein, and an ignition device located in the compression space of said last mentioned cylinder.

JAMES HARRY KEIGHLEY McCOLLUM.